O. V. PAYNE.
FIREARM.
APPLICATION FILED SEPT. 2, 1920.
1,424,773.
Patented Aug. 8, 1922.
3 SHEETS—SHEET 3.
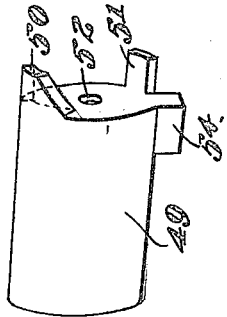
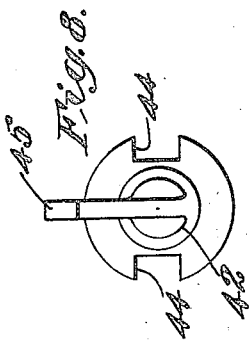
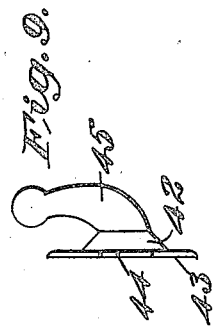
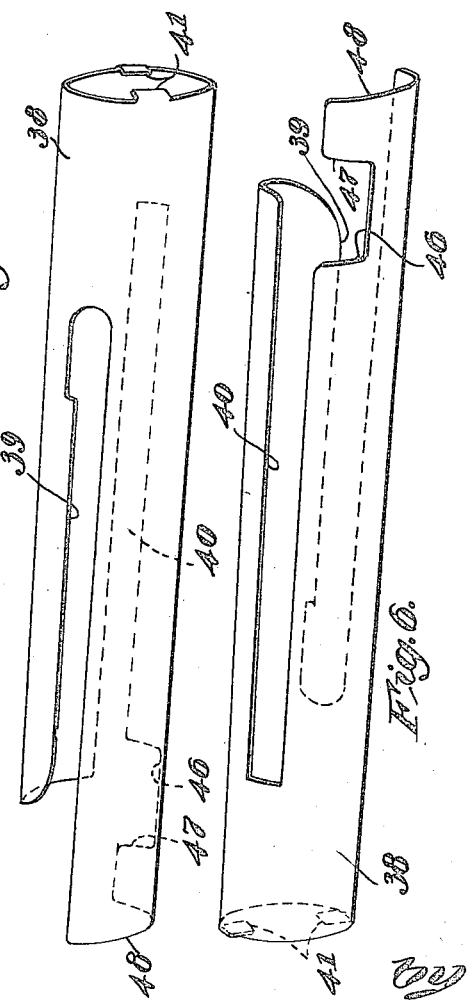
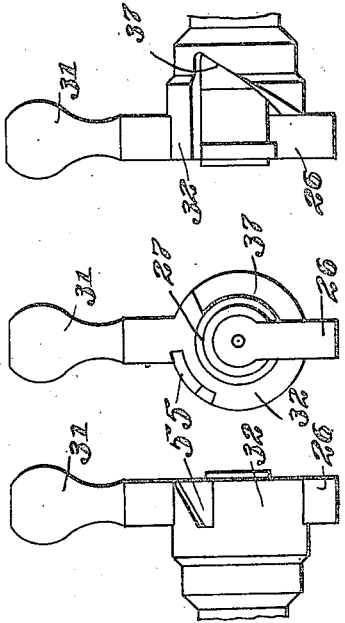

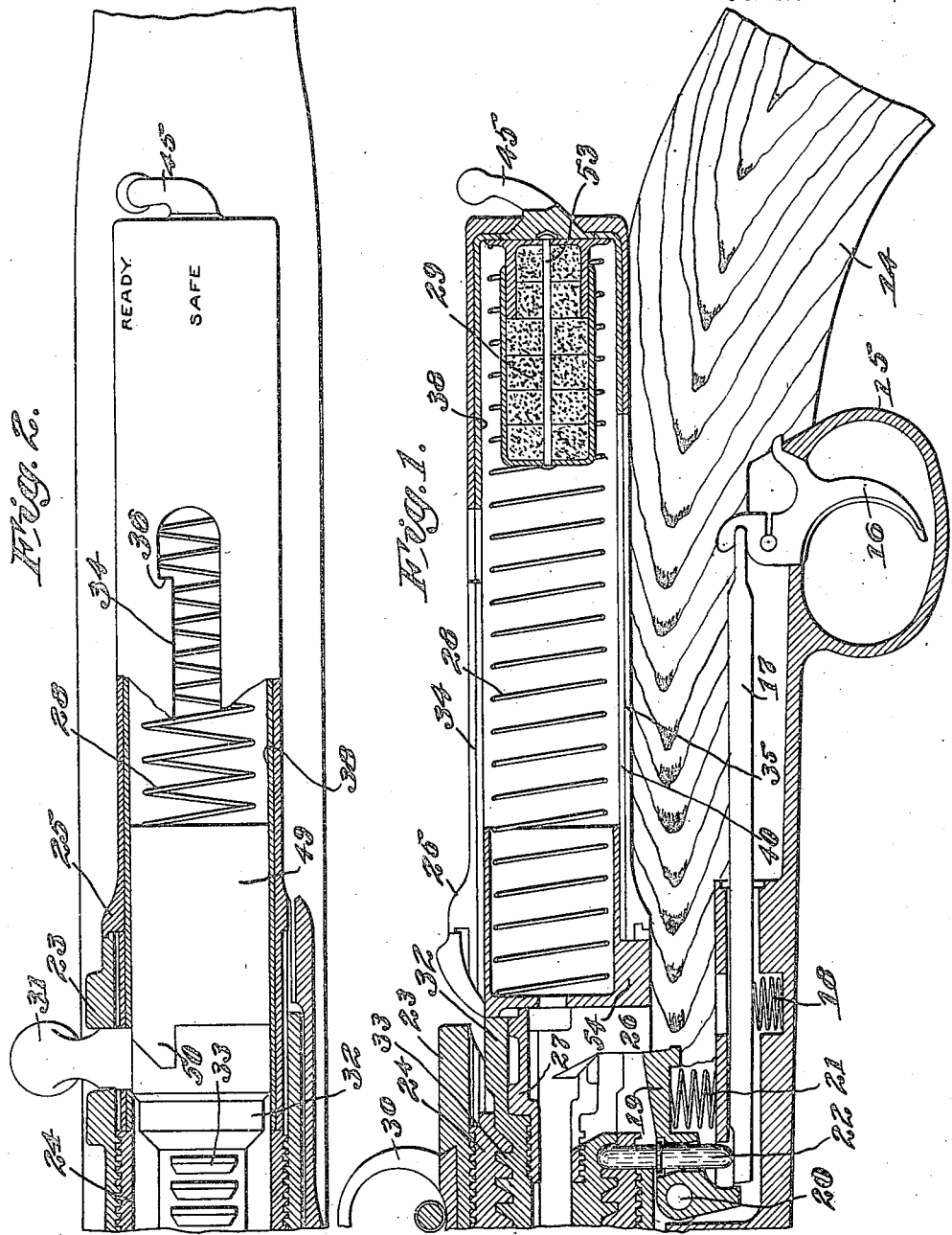

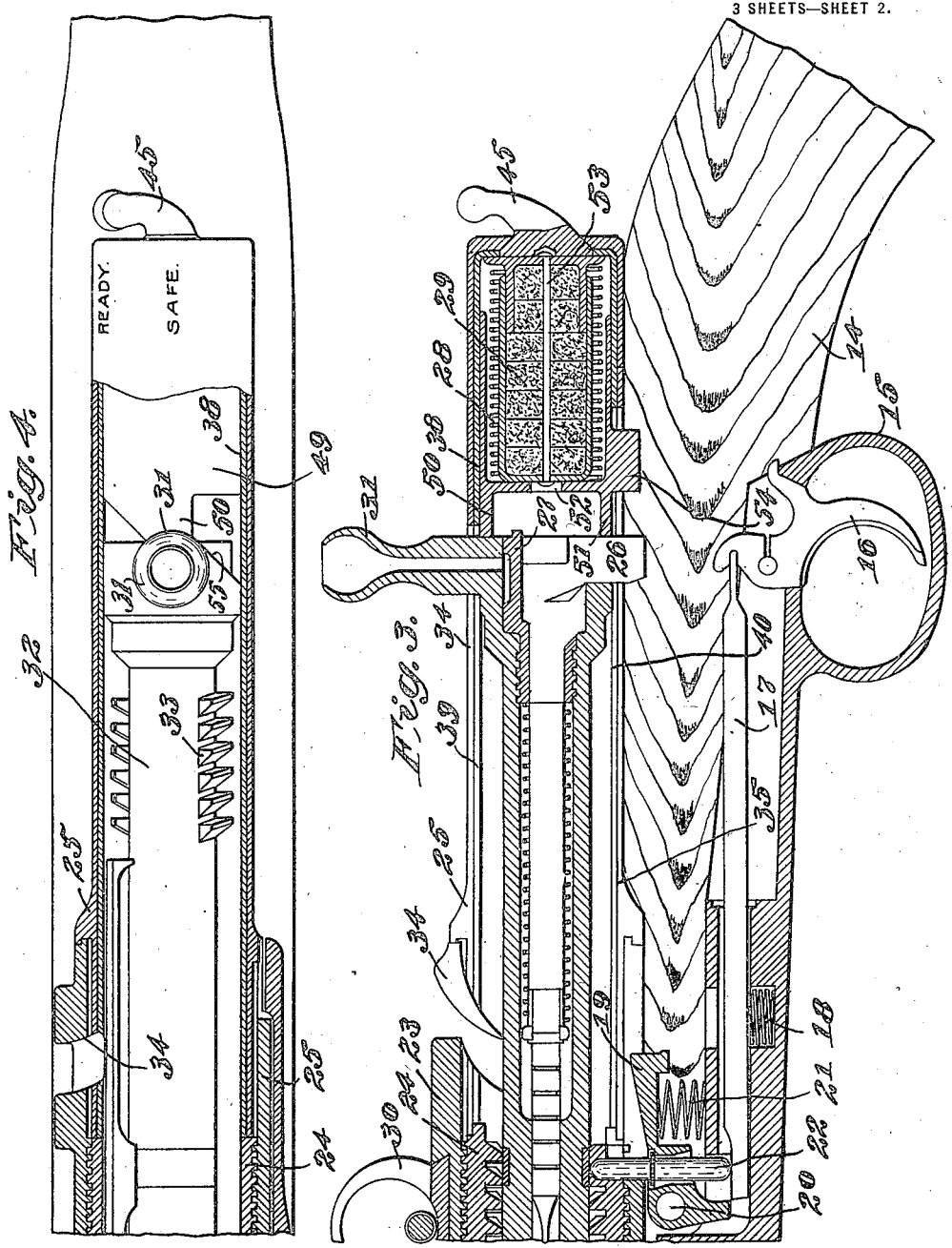

UNITED STATES PATENT OFFICE.

OSCAR V. PAYNE, OF CLEVELAND, OHIO, ASSIGNOR TO AUTO-ORDNANCE CORPORATION, OF NEW YORK, N. Y., A CORPORATION OF NEW YORK.

FIREARM.

1,424,773.  Specification of Letters Patent.  Patented Aug. 8, 1922.

Application filed September 2, 1920. Serial No. 407,761.

*To all whom it may concern:*

Be it known that I, OSCAR V. PAYNE, a citizen of the United States of America, and resident of Cleveland, in the county of Cuyahoga and State of Ohio, have invented new and useful Improvements in Firearms, of which the following is a specification.

This invention relates to an improvement in guns, particularly to arms of the smaller calibres whether of the automatic, semiautomatic or manually operated types, and more particularly to arms having bolts or breech closures which have a combined rotary and reciprocatory movement.

The present invention has been shown in connection with a gun of the type disclosed in my Patent No. 1,347,756, dated July 27, 1920 and is in the nature of an improvement upon certain features of that gun, although the present invention is not limited to use in connection therewith.

In the use of semi-automatic or automatic guns of types in which the bolt in unlocking and opening has first either a combined rotary and longitudinal motion, or a simple rotary motion and then a longitudinal motion, difficulty has been experienced in providing adequate spring resistance during the portion of the movement when rotation takes place since a mere compression spring is compressed only by the longitudinal component of the motion. It is essential that there be spring resistance at this point since the rotary motion usually occurs at the beginning of the stroke when the velocity and pressure are highest. Endeavors have been made to impose resistance at this point by using a recoil spring which not only acts under compression but also is connected to give torsional resistance. Such springs, however, tend rapidly to crystallize and break under the stresses and it is moreover impossible to secure adequate torsional resistance from a spring of the proper weight to give correct resistance to compression. Another objection to their use lies in the fact that due to their lateral thrust they cause fricional engagement of the operating lug against the side of its slot during longitudinal travel.

It has been found that in the case of guns such as that shown in my prior patent, where shutters are moved by the bolt to open slots for passage of bolt handles and other elements, the operation is uncertain due to the very great variation in the frictional resistance of the shutter or shutters, due to varying conditions of heat and lubrication.

It is an object of my invention to provide a new and improved recoil system adapted adequately to resist both rotary and longitudinal movement of the bolt or breech closure. It is an object to provide means for transmitting to a recoil spring a greater compressive stress without additional length of recoil of the breech closure. It is also an object to provide a manually operable shutter adapted to close the necessary openings on the receiver or recoil housing when the gun is not in use, and to provide such a shutter, which, when closed, will lock the firing mechanism and if desired withdraw the firing element from engagement with the sear. It is an additional object to provide means for actuating the combined shutter and safety device which means are so located as to be clearly visible to the operator when the piece is in use. It is a further object to provide means whereby the power of the recoil spring is applied to the bolt to maintain it in its locked or rotated position and to prevent rebound of the locking means when violently closed in rapid action. It is an object to provide these several means which are simple in construction, light in weight, easy of assembly, positive in operation and relatively inexpensive to manufacture. Other and further objects will appear as the description proceeds.

I have illustrated a preferred embodiment of my present invention shown in connection with the gun of my prior patent to which reference has been made above.

In the drawings:—

Fig. 1 is a vertical longitudinal section of the breech portion of the gun, the breech being closed;

Fig. 2 is a view of Fig. 1 as seen from above, portions of the receiver and recoil housing being broken away;

Fig. 3 is a view similar to Fig. 1 but with the breech open;

Fig. 4 is a view of Fig. 3 as seen from above, portions of the receiver and recoil housing being broken away;

Fig. 5 is a perspective of the safety shutter;

Fig. 6 is a reversed perspective similar to Fig. 5;

Fig. 7 is a perspective of the rotary pusher;

Fig. 8 is a rear view of the shutter latch;

Fig. 9 is a side view of the shutter latch;

Fig. 10 is a rear view of the bolt assembly;

Fig. 11 is a fragmentary view of the right side of Fig. 10; and

Fig. 12 is a view similar to Fig. 11 but showing the left side.

Certain portions of the rifle of my prior patent have been shown in order to make clear the location and operation of the parts of the present invention. These portions of the prior rifle include the stock 14, guard 15, trigger 16, trigger bar 17, spring 18, sear 19, sear pin 20, sear spring 21, disconnector 22, forward receiver member 23, lock sleeve 24, rear receiver member or recoil housing 25, firing pin 26, firing pin sleeve 27, recoil spring 28, buffer 29, rear sight 30 and bolt handle 31. The bolt 32 is slightly modified as to its rear portion but is locked to the locking sleeve by the interrupted threads 33 as in the prior patent. The bolt handle 31 operates in a guideway 34 in the receiver and recoil housing. The forward portion of this guidway gradually changes from a longitudinal direction to a direction parallel to the locking threads. The sides of this portion of the guideway are strengthened to take care of the heavy stresses occasioned by the rapid movement of the bolt and bolt handle. As shown in Fig. 2, the rear end of this guideway is laterally enlarged to provide the shoulder 36 which is adapted to retain the bolt in open position when desired. The sear engaging portion of the firing pin 26 moves in a longitudinal slot 35 in the receiver and recoil housing, the slot preventing the pin from turning with the bolt.

The rear face of the bolt is provided with the cam surface 37 best shown in Figs. 10 and 11, which surface acts to retract the firing pin 26 as the bolt is rotated in opening, the firing pin being held against rotation by the slot 35. As the bolt closes the firing pin contacts with the nose of the sear 19 and is held retracted until the sear nose is drawn down by compression of the trigger 16 transmitted to the sear by the trigger bar 17.

In the present invention I provide the safety shutter 38 shown in perspective in Figs. 5 and 6. This shutter is adapted to have an easy sliding fit within the recoil housing 23 and is provided with the slots 39 and 40 corresponding to the slots 34 and 35 in that housing. The rear of the shutter is open save for the bent over ears 41. The shutter latch or actuator 42 shown in Figs. 8 and 9 has the face plate 43 of a size adapted to close the rear of the shutter and of substantially the thickness of the ears 41 and is provided with the recesses 44 adapted to receive those ears. The latch or actuator has the operating handle 45 which is adapted to extend outward and upward through an opening in the rear of the recoil housing as shown in Figs. 1 to 4. The slot 40 of the shutter has its forward portion laterally widened at 46 to form a lock recess, the forward edge 47 of which is upon a slight angle. The forward edge 48 of the shutter is adapted to bear against the rear face of the lock sleeve 24.

The rotary pusher 49 has an easy sliding fit in the shutter 38 and its rear face is cup-shaped as shown in Figs. 1 and 3 to receive the forward end of the recoil spring and to pass over the buffer 29 when in the retracted position. The forward face of the bolt pusher is provided with the cam lug 50, and the bearing lug 51, and is perforated at 52 to give clearance for the buffer pin 53. The lower face of the pusher carries the lug 54 which moves on the slots 35 and 40 in the recoil housing and shutter respectively and thus prevents rotation of the pusher. The cam lug 50 fits into a similarly shaped recess 55 in the rear of the bolt when the bolt is closed.

The assembly of the device is readily accomplished without the use of tools. The recoil housing is held open end up and the latch 42 dropped into it with the handle pointing down. The handle will pass through the opening in the recoil housing and the latch seat itself. The shutter 30 is next slipped into the recoil housing, the ears 41 engaging the recesses 44 on the latch. The buffer 29 is next put in place and is held against the latch and shutter ears by the recoil spring which bears against the buffer face flange. The buffer thus serves to hold the shutter and latch in place and in engagement with each other. The bolt pusher 49 is then placed over the upper end of the recoil spring and with the bolt assembly against it is forced down into the housing until the bolt handle can be locked behind the shoulder 36. This entire assembly may now be connected to the rear of the forward receiver member by means of interengaging interrupted threads between this member and the rear member or recoil housing.

In the operation cycle of the gun, assuming the bolt to be closed and the firing pin forward, the bolt may be manually retracted by means of the handle 31, the firing pin 26 being retracted relative to the bolt at the same time by the cam 37. During the first portion of the opening movement of the bolt handle, a movement which is largely rotary, the cam 50 on the pusher rides out of the cam 55 in the bolt; thus the pusher is thrust rearward and the recoil spring compressed although the bolt moves rearward but slightly. This camming action against the recoil spring serves to afford a live resistance to the movement of the bolt from the beginning, as the pusher moves backward relative to the bolt. It will be clear that in structures where the bolt bears directly upon the spring, there will be but little resistance to the first portion of the opening movement which is largely rotary, the linear component and consequently the spring compression being slight. An important feature of the present device lies in the fact that the cam 50 engages the bolt with a square face during the longitudinal travel so that there is no torsional stress with consequent frictional engagement between the bolt handle and the sides of its slot. Similarly in the closing movement of the breech assembly, the cam thrust from the pusher will aid in positively closing the lock.

When the bolt is operated in automatic or semi-automatic fire the momentum of the bolt will serve to fully close it without the assistance of the pusher cam, but in this case it is closed so suddenly that there is a strong tendency for it to rebound and partially unlock. This commonly occurs when the pusher is not used, the resistance of the recoil spring to the rebound being slight due to the small longitudinal component. With the positive transverse thrust of the pusher cam this rebound is effectually prevented.

When the shutter latch handle is directed toward the word "Ready" stamped on the upper surface of the recoil housing, the slots in the recoil housing and in the shutter are in registration as shown in Fig. 2. It is highly desirable that the upper slot 34 should be covered when not in use in order to prevent entry of foreign matter which might be injurious. With the bolt closed and the firing pin engaged by the sear, the shutter may be rotated by moving the latch handle 45 to point to the word "Safe" and in this position the slot 34 will be covered interiorly by the shutter. As the shutter is thus rotated the depending portion of the firing pin and the lug 54 on the pusher pass into the portion 46 of the slot 40, the firing pin being engaged by the cam 47 and thus drawn back slightly out of engagement with the sear. The piece is thus locked safe and can not be fired.

If the firing pin were not drawn back as described, it would be possible, by drawing the trigger back while the piece is locked, to have the sear catch under the end of the firing pin and thus permit the piece to fire immediately upon being unlocked. When the bolt is retracted the face of the cam lug 50 and of the thrust lug 51 bear against the rear face of the bolt. While but one cam lug has been shown it is obvious that a plurality of such lugs may be provided if desired.

The two positions of the latch handle or shutter actuator 45 are preferably as shown so that the actuator projects upward when in the safe position and being directly in the line of sight is a positive notice to the user that the gun is locked and cannot be fired.

I claim:

1. A gun comprising a receiver, a bolt adapted to reciprocate longitudinally in the receiver, the bolt having a laterally extending portion passing outwardly through a slot in the receiver, a shutter in the receiver for closing said slot, recoil mechanism within said shutter, and means on said shutter engaged by said recoil mechanism to retain said shutter in adjusted position.

2. A gun comprising a receiver, a bolt adapted to reciprocate longitudinally in the receiver, the bolt having a laterally extending portion passing outwardly through a slot in the receiver, a shutter in the receiver for closing said slot, recoil mechanism within said shutter, a shutter actuator having a handle extending outwardly from the receiver for actuating said shutter, said actuator having a portion frictionally engaged by said recoil mechanism whereby said actuator and shutter are retained in adjusted position.

3. A gun comprising a receiver, a bolt adapted to reciprocate longitudinally in the receiver, the bolt having a laterally extending portion passing outwardly through a slot in the receiver, a shutter in the receiver for closing said slot, recoil mechanism within said shutter including a recoil buffer, a shutter actuator having a handle extending outwardly from the receiver and interlocking means on said shutter and actuator engaged by said recoil buffer whereby said interlocking means are retained in interlocked position.

4. A gun comprising a receiver having a slot therein, a breech mechanism adapted to reciprocate longitudinally in the receiver, the breech mechanism having a portion extending through the slot in the receiver, a tubular shutter independent of the breech mechanism and adapted to cover a portion of said slot, said shutter having an open end, and a member closing the open end of said shutter and having means whereby the shutter is actuated.

5. A gun comprising a receiver, a bolt adapted to reciprocate longitudinally in the receiver, the bolt having a laterally extending portion passing outward through a slot in the receiver, a shutter in the receiver for closing said slot, said shutter having ears extending therefrom, and a shutter actuator having recesses adapted to receive said ears and thereby interlock with the shutter.

6. A gun comprising a receiver, a bolt adapted to reciprocate longitudinally in the receiver, the bolt having a laterally extending portion passing outward through a slot in the receiver, a shutter in the receiver for closing said slot, said shutter having ears extending therefrom, a shutter actuator having recesses adapted to receive said ears and thereby interlock with the shutter, and having an operating handle extending outward through the rear of the receiver.

7. A gun comprising a receiver, a bolt adapted to reciprocate longitudinally in the receiver, the bolt having a laterally extending portion passing outward through a slot in the receiver, a tubular shutter in the receiver for closing said slot, said shutter having ears extending inwardly from its rear edges, a shutter actuator having a portion adapted to fit into the rear end of the receiver and having recesses to receive the shutter ears, and an operating handle on said actuator extending outwardly through the receiver.

8. A gun comprising a receiver, a bolt adapted to reciprocate longitudinally in the receiver, the bolt having a laterally extending portion passing outward through a slot in the receiver, a tubular shutter in the receiver for closing said slot, said shutter having ears extending inwardly from its rear edges, a shutter actuator having a portion adapted to fit into the rear end of the receiver and having recesses to receive the shutter ears, said portion of the actuator having substantially the same thickness as said ears, and an operating handle on said actuator extending outwardly through the rear end of the receiver.

9. A gun comprising a receiver, a bolt adapted to reciprocate longitudinally in the receiver, the bolt having a laterally extending portion passing outward through a slot in the receiver, a recoil spring, a shutter for closing said slot, a shutter actuator, and interlocking means upon the shutter and actuator arranged to be maintained in interlocked engagement by the thrust of the recoil spring.

10. A gun comprising a receiver, a bolt adapted to reciprocate longitudinally in the receiver, the bolt having a laterally extending portion passing outward through a slot in the receiver, a recoil spring, a buffer, a tubular shutter for closing said slot, and a shutter actuator in the receiver, interlocking ears and recesses upon the shutter and actuator, the buffer contacting with said interlocking portions to maintain them in interlocked relation.

11. A gun comprising a receiver, a bolt adapted to reciprocate longitudinally in the receiver, the bolt having a laterally extending portion passing outward through a slot in the receiver, a recoil spring, a buffer, a tubular shutter for closing said slot and a shutter actuator in the receiver, interlocking ears and recesses upon the shutter and actuator, the buffer being urged against said interlocking portions by the recoil spring to maintain them in interlocking relation.

12. A gun comprising a receiver having a slot therein, a breech mechanism adapted to reciprocate longitudinally in the receiver, the breech mechanism having a portion extending through the slot in the receiver, a tubular shutter independent of the breech mechanism and adapted to cover a portion of said slot, said shutter having an open end, a member removably closing the open end of said shutter, and interlocking means on said member and said shutter whereby the latter may be actuated to cover said slot.

13. A gun comprising a receiver having a slot therein, a breech mechanism adapted to reciprocate longitudinally in the receiver, the breech mechanism having a portion extending through the slot in the receiver, a tubular shutter independent of the breech mechanism and adapted to cover a portion of said slot, said shutter having an open end, a member removably closing the open end of said shutter, and interlocking means comprising ears on said shutter extending across the open end thereof and recesses in said member whereby the shutter may be actuated to cover said slot.

14. A gun comprising a receiver having a slot therein, a bolt adapted to reciprocate longitudinally in the receiver, a firing member carried by the bolt in its reciprocation and having a portion extending through the slot in the receiver, a shutter located in the receiver, the shutter having means engageable with said portion to hold the firing member retracted, and a shutter actuator extending outwardly from the receiver whereby the shutter may be manually operated to cover a portion of the slot and also to hold the firing member.

15. A gun comprising a receiver having a slot therein, a bolt adapted to reciprocate longitudinally in the receiver, a firing member carried by the bolt in its reciprocation and having a portion extending through the slot in the receiver, a tubular shutter located in the receiver and having ears extending inwardly from its rear edges, a shutter operating latch having a portion adapted to fit into the rear end of the receiver and having recesses to receive the shutter ears, the latch portion being of substantially the same thickness as said ears, and an operating handle on said latch extending outwardly through the rear end of the receiver.

16. A gun comprising a receiver having a slot therein, a bolt adapted to reciprocate longitudinally in the receiver, a firing member carried by the bolt in its reciprocation and having a portion extending through the slot in the receiver, a sear adapted to engage the extending portion of the firing member, and means adapted to coact with said extending portion to disengage it from the sear.

17. A gun comprising a receiver having a slot therein, a bolt adapted to reciprocate longitudinally in the receiver, a firing member carried by the bolt in its reciprocation and having a portion extending through the slot in the receiver, a sear adapted to engage the extending portion of the firing member, and a shutter adapted to engage the firing member and to disengage it from the sear.

18. A gun comprising a receiver having a slot therein, a bolt adapted to reciprocate longitudinally in the receiver, a firing member carried by the bolt in its reciprocation and having a portion extending through the slot in the receiver, a sear adapted to engage the extending portion of the firing member, and a tubular shutter located in the receiver and adapted to be rotated to engage the firing member and disengage it from the sear.

19. A gun comprising a receiver having a slot therein, a bolt adapted to reciprocate longitudinally in the receiver, a firing member carried by the bolt in its reciprocation and having a portion extending through the slot in the receiver, a sear adapted to engage the extending portion of the firing member, and a tubular shutter having a slot adapted normally to be in registration with the slot in the receiver, the shutter slot having a lateral recess extending therefrom, and means adapted to rotate the shutter to bring the firing member within the lateral recess.

20. A gun comprising a receiver having a slot therein, a bolt adapted to reciprocate longitudinally in the receiver, a firing member carried by the bolt in its reciprocation and having a portion extending through the slot in the receiver, a sear adapted to engage the extending portion of the firing member, and a tubular shutter having a slot adapted normally to be in registration with the slot in the receiver, the shutter slot having a lateral cam recess extending therefrom, and means adapted to rotate the shutter to bring the firing member within the lateral recess to thereby move the firing member out of engagement with the sear.

21. A gun comprising a receiver having a plurality of slots therein, a bolt adapted to reciprocate longitudinally in the receiver, the bolt having a lateral extension passing outward through one of said slots in the receiver, a firing member carried by the bolt in its reciprocation and having a portion extending through another slot in the receiver, and a shutter operating independently of the bolt and adapted to cover portions of the slots.

22. A gun comprising a receiver having a plurality of slots therein, a bolt adapted to reciprocate longitudinally in the receiver, the bolt having a lateral extension passing outward through one of said slots in the receiver, a firing member carried by the bolt in its reciprocation and having a portion extending through another slot in the receiver, and a tubular shutter having slots adapted to be normally in registration with the slots in the receiver, the shutter slot engaging the firing member having a lateral recess extending therefrom and means adapted to rotate the shutter and bring the firing member within the recess.

23. A gun comprising a receiver having a plurality of slots therein, a bolt adapted to reciprocate longitudinally in the receiver, the bolt having a lateral extension passing outward through one of said slots in the receiver, a firing member carried by the bolt in its reciprocation and having a portion extending through another slot in the receiver, and a tubular shutter having slots adapted to normally be in registration with the slots in the receiver, the shutter slot receiving the firing member having a lateral cam recess extending therefrom and means adapted to rotate the shutter and bring the firing member within the recess, to thereby move the firing member rearwardly, portions of the shutter covering portions of the slots in the receiver.

24. A gun comprising a receiver having a plurality of slots therein, a bolt adapted to reciprocate longitudinally in the receiver, the bolt having a lateral extension passing outward through one of said slots in the receiver, a firing member carried by the bolt in its reciprocation and having a portion extending through another slot in the receiver and a pusher member in the receiver in rear of the bolt and having a lug extending through the second slot in the receiver.

25. A gun comprising a receiver having a plurality of slots therein, a bolt adapted to reciprocate longitudinally in the receiver, the bolt having a lateral extension passing outward through one of said slots in the receiver, a firing member carried by the bolt in its reciprocation and having a portion extending through another slot in the receiver, a pusher-member in the receiver in the rear of the bolt and having a lug extending through the second slot in the receiver, and a shutter operating in the receiver and adapted to cover portions of the slots.

26. A gun comprising a receiver having a plurality of slots therein, a bolt adapted to reciprocate longitudinally on the receiver, the bolt having a lateral extension passing outward through one of said slots in the receiver, a firing member carried by the bolt in its reciprocation and having a portion extending through another slot in the receiver, a pusher-member in the receiver in the rear of the bolt and having a lug extending through the second slot in the receiver, and a shutter operating in the receiver, the shutter having a recess therein and being adapted to be moved to engage the firing member extension and pusher lugs in said recess.

27. A gun comprising a receiver having a plurality of slots therein, a bolt adapted to reciprocate longitudinally on the receiver, the bolt having a lateral extension passing outward through one of said slots in the receiver, a firing member carried by the bolt in its reciprocation and having a portion extending through another slot in the receiver, a pusher-member in the receiver in the rear of the bolt and having a lug extending through the second slot in the receiver, and a shutter operating in the receiver, the shutter having a cam recess therein and being adapted to be moved to engage the firing member extension and pusher lugs in said recess, and to move the firing member rearwardly toward the pusher lug.

28. A gun comprising a receiver, a bolt adaptable to reciprocate longitudinally in the receiver and to rotate into locked position at the forward end of its stroke, the bolt having a laterally extending portion passing outward through a slot in the receiver, a pusher in said receiver adjacent the rear end of the bolt, a recoil spring bearing against the pusher, a portion of the pusher engaging the receiver to prevent rotation of the pusher, a shutter in the receiver for closing the slot therein, means for manually operating said shutter comprising an actuator removably attached thereto and having a handle extending outwardly of said receiver, and means actuated by said recoil spring for retaining said shutter and said actuator in operative engagement.

29. A gun comprising a receiver, a bolt adapted to reciprocate longitudinally in the receiver and to rotate into locked position at the forward end of its stroke, the bolt having a laterally extending portion passing outward through a slot in the receiver, a pusher in said receiver adjacent the rear end of the bolt, a recoil spring bearing against the pusher, a portion of the pusher engaging the receiver to prevent rotation of the pusher, forwardly extending lugs upon the pusher adapted to engage the rear face of the bolt during its longitudinal movement and to extend into the contour of the bolt during its rotary movement, a shutter in the receiver for closing the slot therein, and means for manually operating said shutter comprising an actuator removably attached thereto and having a handle extending outwardly of said receiver, said shutter being constructed and arranged to be held in adjusted position by the pressure of said recoil spring.

30. A gun comprising a receiver, a bolt adapted to reciprocate longitudinally in the receiver and to rotate into locked position at the forward end of its stroke, the bolt having a laterally extending portion passing outwardly through a slot in the receiver, a tubular shutter in the receiver for closing the slot therein, a shutter actuator closing one end of said tubular shutter and extending outwardly from the receiver, interlocking means on said shutter and actuator whereby the former may operate the latter, a pusher in said receiver adjacent the rear end of the bolt, a recoil spring bearing against the pusher, a portion of the pusher engaging the receiver to prevent rotation of the pusher, and interengaging cam surfaces upon the pusher and bolt whereby the pusher is forced rearwardly against the recoil spring during the unlocking rotation of the bolt and whereby the spring acts to assist the locking rotation of the bolt.

31. A gun comprising a receiver, a bolt adapted to reciprocate longitudinally in the receiver and to rotate into locked position at the forward end of its stroke, the bolt having a laterally extending portion passing outwardly through a slot in the receiver, a tubular shutter in the receiver for closing the slot therein, a shutter actuator closing one end of said tubular shutter and extending outwardly from the receiver, interlocking means on said shutter and actuator whereby the former may operate the latter, a pusher in said receiver adjacent the rear end of the bolt, a recoil spring bearing against the pusher, a portion of the pusher engaging the receiver to prevent rotation of the pusher, interengaging cam surfaces upon the pusher and bolt whereby the pusher is forced rearwardly against the recoil spring during the unlocking rotation of the bolt, the cam surfaces being in engagement when the bolt is in locked position, and being out of engagement when the bolt is in unlocked position, and means actuated by said recoil spring for retaining said shutter in adjusted position.

Signed by me at Cleveland, Ohio this 30th day of August 1920.

OSCAR V. PAYNE.